Figure 2:
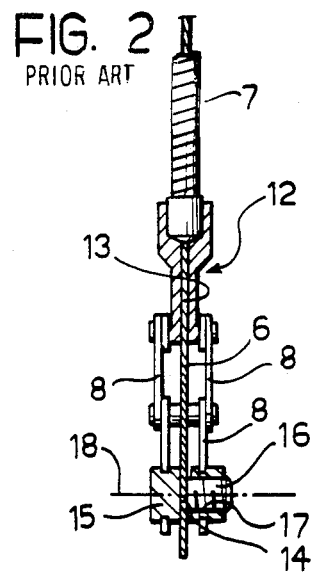

United States Patent [19]

Romano

[11] Patent Number: 4,869,351
[45] Date of Patent: Sep. 26, 1989

[54] BICYCLE BRAKE OF THE CENTER-PULL TYPE

[75] Inventor: Antonio Romano, Padua, Italy

[73] Assignee: Campagnolo S.p.A., Vicenza, Italy

[21] Appl. No.: 238,671

[22] Filed: Aug. 31, 1988

[30] Foreign Application Priority Data

Sep. 29, 1987 [IT] Italy ................. 67824 A/87

[51] Int. Cl.⁴ ............................... B62L 3/00
[52] U.S. Cl. ................. 188/24.21; 74/502.4; 74/502.6; 188/2 D; 188/24.22
[58] Field of Search .......... 188/2 D, 24.12, 24.21, 188/24.22; 74/502.4, 502.6

[56] References Cited

U.S. PATENT DOCUMENTS

| 3,680,663 | 8/1972 | Kine | 188/72.9 X |
| 4,552,251 | 11/1985 | Schoch | 188/24.21 |
| 4,667,778 | 5/1987 | Ozaki | 188/24.12 |

FOREIGN PATENT DOCUMENTS

| 405137 | 12/1909 | France | 188/24.21 |
| 450500 | 1/1913 | France | 188/24.21 |
| 603880 | 4/1926 | France | 188/24.21 |
| 906382 | 1/1946 | France | 188/24.12 |
| 1112316 | 3/1956 | France | 188/24.12 |
| 302510 | 12/1963 | Netherlands | 188/24.21 |

Primary Examiner—George E. A. Halvosa
Attorney, Agent, or Firm—Sughrue, Mion, Zinn, Macpeak & Seas

[57] ABSTRACT

A bicycle brake includes a pair of calipers which are provided with brake blocks and pivot about two parallel axes, and which are resiliently biassed towards a rest position and movable into an operative braking position by a flexible cable fixed within a through-hole in a member for operating the calipers and acting in a direction contained in a plane equidistant from the two pivoting axes of the calipers. The end part of the cable is pressed into the through-hole by a threaded element. To enable the cable to be mounted rapidly and easily, the operating member has a slot passing through it and opening into the through-hole, and is arranged so that the end part of the cable can be inserted into the hole through the slot by the movement of the cable in a direction peripendicular to its axis.

1 Claim, 3 Drawing Sheets

U.S. Patent  Sep. 26, 1989  Sheet 1 of 3  4,869,351

BICYCLE BRAKE OF THE CENTER-PULL TYPE

The present invention relates to bicycle brakes of the so-called centre-pull type, that is, of the type including a pair of calipers which are provided with brake blocks and pivot about two parallel axes, and which are resiliently biassed towards a rest position and movable into an operative braking position by means of a flexible cable fixed within a through-hole in a member for operating the calipers and acting in a direction contained in a plane equidistant from the two pivoting axes of the calipers, the end part of the cable being pressed into the through-hole by a threaded element.

In a known brake of the aforementioned type, the means for operating the jaws are constituted by an articulated parallelogram having two opposite vertices connected to the jaws, and the other two vertices connected to the flexible cable and to its sheath respectively. In this type of brake, the fitting of the flexible cable is difficult, since it must be inserted through a guide hole provided in the vertex of the articulated parallelogram connected to the sheath of the cable, after which it must be fixed within the through-hole provided in an element situated at the opposite vertex of the articulated parallelogram. Since the cable has a certain stiffness and a certain curvature, it is quite difficult to insert it into the second fixing hole after it has been inserted through the first guide hole.

In order to avoid this problem, the object of the present invention is to provide a brake of the type specified at the beginning of the present description, characterised in that the operating member to which the cable is fixed has a slot passing through it and opening into the through-hole, and is arranged so that the end part of the cable can be inserted into the hole through the slot by the movement of the cable in a direction perpendicular to its axis.

By virtue of this characteristic, the fitting of the cable is quick and easy.

Figure 1:
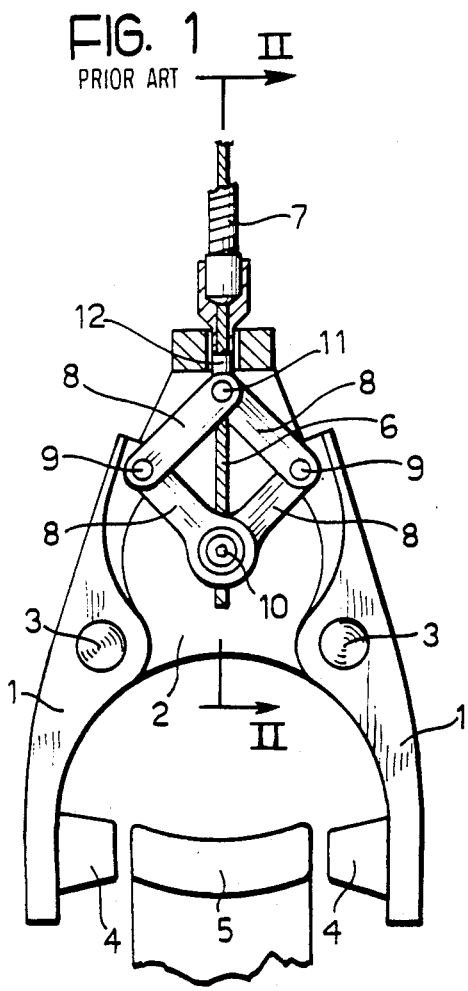
Figure 3:
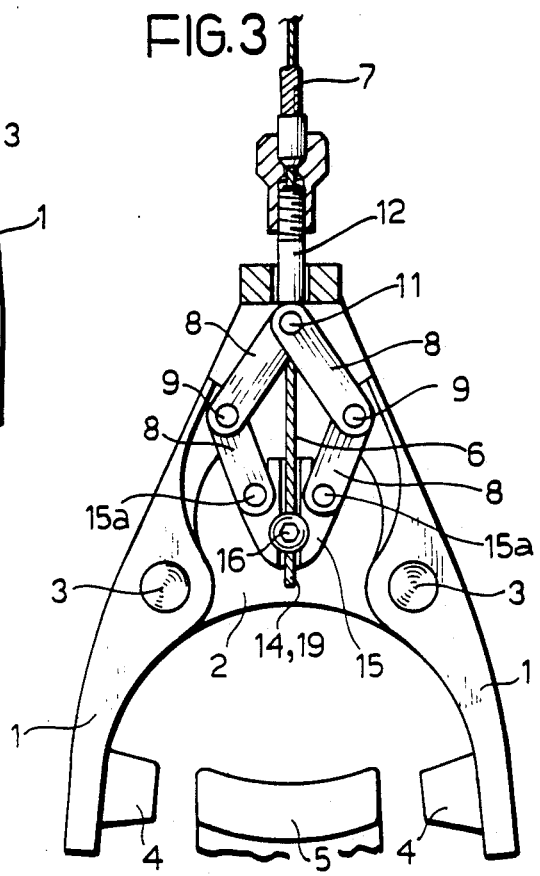
Figure 4:
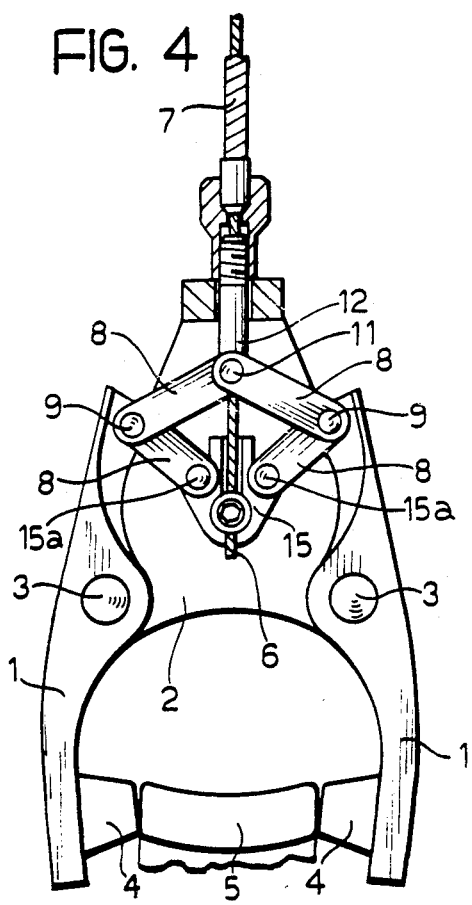
Figure 5:
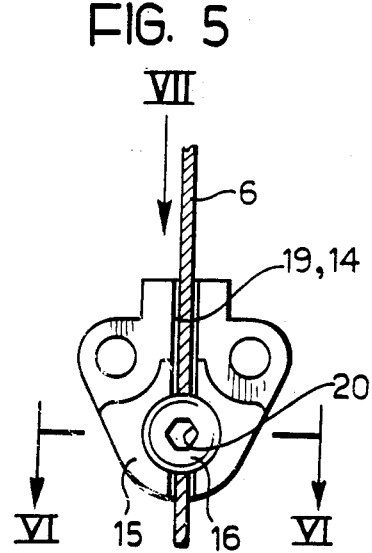
Figure 6:
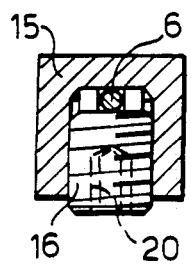
Figure 7:
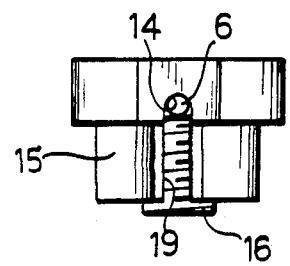
Figure 8:
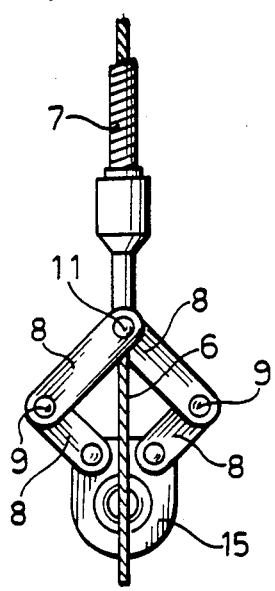
Figure 9:
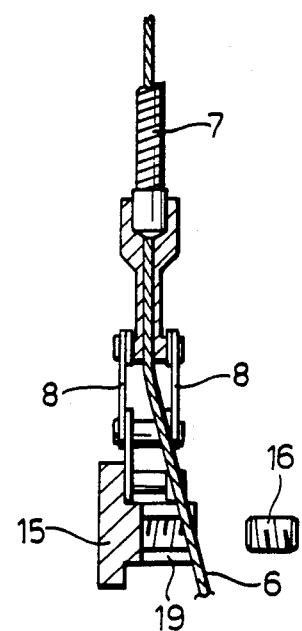
Figure 10:
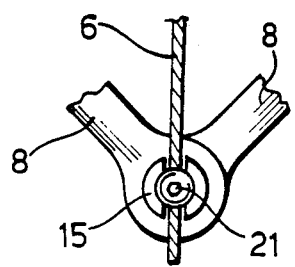
Figure 11:
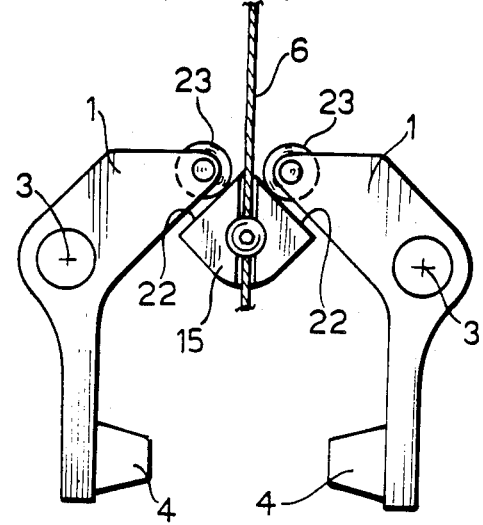

Further characteristics and advantages of the present invention will become clear from the description which follows with reference to the appended drawings, provided by way of non-limiting example, in which:

FIGS. 1 and 2 are a front view of a known brake, and a section of a known brake taken on the line II—II of FIG. 1, FIGS. 3 and 4 show two different operative conditions of a first embodiment of the brake according to the invention, FIG. 5 shows a detail of FIG. 3 on an enlarged scale, FIG. 6 is a section taken on the line VI—VI of FIG. 5, FIG. 7 is a view of the detail of FIG. 5 from above, FIG. 8 shows a variant of FIG. 3, FIG. 9 shows a section taken on the line IX—IX of FIG. 8, FIG. 10 shows a variant of FIG. 8, and FIG. 11 shows a further variant of FIG. 8.

FIGS. 1 and 2 show a known brake comprising two calipers 1 mounted on a support structure 2 for pivoting about two parallel axes 3 and carrying two brake blocks 4 which are intended to engage the sides of the rim 5 of a bicycle wheel to cause its braking. The calipers 1 are biassed towards the open position shown in FIG. 1 by resilient means (not illustrated) of known type. The calipers 1 can be brought into an operative braking position by the operation of a flexible cable 6 provided with a sheath 7. The flexible cable 6 operates the calipers 1 by means of an articulated parallelogram constituted by four pairs of connecting rods 8. Two opposite vertices 9 of the parallelogram are connected to the two calipers 1, whilst the other two vertices 10 and 11 are connected to the flexible cable 6 and to an element 12 fixed to the sheath 7. As can be seen n FIG. 2, the cable passes through a first through-hole 13 formed in the element 12 and is fixed in a second through-hole 14 formed in an operating member in the form of a block 15 situated in correspondence with the articulation 10. The cable 6 is held in the hole 14 by a grub screw 16 which is screwed into a cylindrical threaded cavity 17 formed in the block 15. The cavity 17 has an axis 18 which is perpendicular to the axis of the hole 14. When the grub screw 16 is screwed into the cavity it presses against the cable 6.

In the known brake described above, the mounting of the cable 6 is difficult. In fact, since the end part of the cable usually has a certain curvature and a certain stiffness, after this part has been inserted through the hole 13, it is then difficult to make it pass through the hole 14 since the latter is coaxial with the hole 13 and is situated a certain distance therefrom.

FIG. 3 shows a first embodiment of the brake according to the invention. In this figure, the parts in common with FIGS. 1 and 2 are indicated by the same reference numerals. The main difference with respect to the known brake lies in the fact that the block 15 in which the through-hole 14 is formed has a slot 19 which passes through it vertically (FIGS. 5-7) and opens into the hole 14. By virtue of this characteristic, it is possible to insert the end part of the cable 6 into the hole 14 by the movement of that part in a direction perpendicular to the axis of the cable, instead of by axial movement of the cable itself. The fixing of the cable is then achieved by means of the usual grub screw 16 (in the embodiment illustrated, the screw 16 is provided with a recess 20 (FIGS. 5, 6) for its operation by means of an operating key).

In the case of the embodiment illustrated in FIGS. 3 to 7, the connecting rods 8 connected to the block 15 are articulated at two separate axes 15a. This is also true of the embodiment shown in FIGS. 8 and 9, which differs only in the conformation of the block 15. FIG. 9 shows the cable 6 in its position immediately before its fixing by means of the grub screw 16.

FIG. 10 shows a variant in which the connecting rods 8 connected to the block 15 are articulated about the same axes 21. Finally, FIG. 11 relates to the case in which the block 15 has cam surfaces 22 which cooperate with wheels 23 carried by the jaws 1 to cause the movement of the calipers. The block 15 therefore functions as a replacement for the lower connecting rods 8 of the embodiment shown in FIG. 3.

Naturally, the principle of the invention remaining same, the forms of embodiment and details of construction may be varied widely with respect to those described and illustrated purely by way of example, without thereby departing from the scope of the present invention.

What is claimed is:

1. A bicycle brake comprising
   support means,
   a pair of calipers mounted on said support means for pivotal movement about two parallel axes,
   respective brake blocks carried by the calipers, a flexible cable for moving the calipers into an operative braking position and acting in a direction contained in a plane equally distant from the two pivot axes of the calipers, a sheath surrounding said cable and having an end member disposed adjacent said support means, a first pair of connecting rods connected to said end member of said sheath for pivotal movement about a common axis with the opposite ends of said connecting rods being articulated to respective ends of said claipers, an operating member connected to said cable and a second pair of connecting rods pivotally connected at one end thereof to said operating member for pivotal movement about two parallel spaced apart pins with the opposite ends thereof articulated to the two calipers and said opposite ends of said first pair of connecting rods to define an articulated parallelogram, said operating member having a through-hole through which the cable extends and a laterally extending slot extending therethrough and opening into said through-hole so that the end part of the cable can be inserted into the hole through the slot by movement of the cable in a direction perpendicular to the axis of the through-hole and a threaded element threadingly connected to said operating member through said slot for engaging and securing the end part of the cable in said through-hole.

* * * * *